(12) United States Patent
Aston et al.

(10) Patent No.: US 8,915,472 B2
(45) Date of Patent: Dec. 23, 2014

(54) MULTIPLE SPACE VEHICLE LAUNCH SYSTEM

(75) Inventors: Richard W. Aston, Brea, CA (US); Anna M. Tomzynska, Seal Beach, CA (US); Glenn N. Caplin, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 324 days.

(21) Appl. No.: 13/604,050

(22) Filed: Sep. 5, 2012

(65) Prior Publication Data

US 2013/0299641 A1    Nov. 14, 2013

Related U.S. Application Data

(60) Provisional application No. 61/646,222, filed on May 11, 2012.

(51) Int. Cl.
*B64G 1/40* (2006.01)
*B64G 1/64* (2006.01)
*B64G 1/00* (2006.01)

(52) U.S. Cl.
CPC ............... *B64G 1/405* (2013.01); *B64G 1/641* (2013.01); *B64G 1/002* (2013.01); *B64G 1/40* (2013.01)
USPC ................... 244/171.1; 244/173.1; 244/173.3

(58) Field of Classification Search
USPC ........... 244/173.1, 173.3, 171.3, 171.1, 158.1
See application file for complete search history.

(56) References Cited

U.S. PATENT DOCUMENTS

| 3,420,470 | A | | 1/1969 | Meyer | |
|---|---|---|---|---|---|
| 5,397,082 | A | * | 3/1995 | Scott | 244/158.4 |
| 5,716,029 | A | | 2/1998 | Spitzer et al. | |
| 7,113,851 | B1 | * | 9/2006 | Gelon et al. | 701/13 |
| 7,138,960 | B2 | * | 11/2006 | Carroll et al. | 343/882 |
| 7,219,858 | B2 | * | 5/2007 | Sharer | 244/158.4 |
| 8,016,240 | B2 | * | 9/2011 | Caplin et al. | 244/158.5 |

(Continued)

FOREIGN PATENT DOCUMENTS

JP     03193597     8/1991

OTHER PUBLICATIONS

Clark, S., "Two broadcasting satellites share Proton rocket ride," web page of Spaceflight Now, http://www.spaceflightnow.com/proton/ses3/ (Jul. 15, 2011).

(Continued)

*Primary Examiner* — Christopher P Ellis
*Assistant Examiner* — Medhat Badawi
(74) *Attorney, Agent, or Firm* — Clifford G. Cousins

(57) ABSTRACT

A multiple space vehicle launch system that may be adapted to be disposed within a payload region of a launch vehicle fairing. The launch system may include a first space vehicle, a second space vehicle releasably attached to the first space vehicle and oriented relative to the first space vehicle such that, when placed within the fairing, a launch load of the first space vehicle is transmitted to and borne by the second space vehicle. In certain embodiments, the first and second space vehicles each may include one of an electrical propulsion unit and a hybrid chemical and electrical propulsion unit. Use of electrical or hybrid chemical and electrical propulsion units enables the second space vehicle to bear all or a significant portion of the launch load of the first space vehicle, thereby eliminating the need for additional support structure.

23 Claims, 3 Drawing Sheets

(56) References Cited

U.S. PATENT DOCUMENTS

| | | | |
|---|---|---|---|
| 8,499,874 B2* | 8/2013 | Dewis et al. | 180/165 |
| 8,511,617 B2* | 8/2013 | Caplin et al. | 244/173.1 |
| 2006/0016934 A1* | 1/2006 | Sharer | 244/158.4 |
| 2008/0149777 A1 | 6/2008 | Benedict et al. | |
| 2008/0237399 A1* | 10/2008 | Caplin et al. | 244/158.4 |
| 2009/0224105 A1* | 9/2009 | Caplin et al. | 244/158.4 |
| 2010/0176248 A1* | 7/2010 | Terziakin | 244/171.3 |
| 2012/0097796 A1 | 4/2012 | Munir et al. | |
| 2012/0097797 A1* | 4/2012 | Woo et al. | 244/158.6 |
| 2012/0210852 A1* | 8/2012 | McCants, Jr. | 89/1.8 |

OTHER PUBLICATIONS

European Search Report, European Application No. 13167339.4 (Sep. 26, 2013).

Porte, F. et al., "Benefits of Electric Propulsion for Orbit Injection of Communication Spacecraft," International Communication Satellite Systems Conference and Exhibit, pp. 1-9 (Mar. 22, 1992).

Mailhe, L.M. et al., "Design of a Hybrid Chemical/Electric Propulsion Orbital Transfer Vehicle," Journal of Spacecraft and Rockets, vol. 39, No. 1, pp. 131-139 (Jan. 2002).

* cited by examiner

MULTIPLE SPACE VEHICLE LAUNCH SYSTEM

BACKGROUND

The present disclosure is directed to space vehicle launch systems and, more particularly, to space vehicle launch systems for launching multiple payloads.

Typical launch vehicles are very expensive. Further, each kilogram of payload that is to be launched into Earth orbit may require as much as ten kilograms of fuel. Accordingly, it may be desirable to minimize payload mass in order to reduce overall cost and fuel requirements. One mechanism for reducing payload mass may be to eliminate any unnecessary structure from the payload.

As a result of such cost concerns, it may be desirable to launch two or more discrete payloads with a single launch vehicle. Such multiple payloads may be in the form of space vehicles, such as satellites. Typically, such satellites themselves may require and incorporate chemical rocket motors to increase orbital altitude and for make altitude adjustments once the desired orbital altitude is achieved.

Such chemically powered space vehicles are relatively heavy. Due to space constraints within the payload region of the fairing, it is often necessary to orient such space vehicles in a linear or stacked column that may extend along a central longitudinal axis of the launch vehicle. When such a launch vehicle is on a launch pad, and after lift-off, the orientation of such space vehicles is substantially vertical.

As a result, the weight, or gravitational force of the mass, of an upper space vehicle may bear down upon a lower space vehicle in such a vertical configuration. When the launch vehicle lifts off the launch pad, this gravitational force is multiplied as a result of the acceleration of the launch vehicle into Earth orbit. Because of the mass of the space vehicles, especially if equipped with chemical rocket motors, the lower space vehicle may not be unable to withstand the gravitational force and launch load of the upper space vehicle. Accordingly, a support structure is required.

One example of such support structure is a dual-launch structure denoted in French as Systeme de Lancement Double Ariane (Sylda), or in English this is known as a Double Ariane Launch System, as employed on the Ariane 4 and Ariane 5 rockets. A Sylda may be made of carbon fiber and be in the form of a hollow structure that encloses the lower space vehicle and engages and supports the upper space vehicle. Gravitational forces and launch loads may be transmitted from the upper space vehicle, to the Sylda, and from the Sylda to the support base of the fairing. Thus, the lower space vehicle does not have to support the mass and launch load of the upper space vehicle.

A disadvantage of such an arrangement may be that the use of a Sylda adds to the overall payload mass, which may increase the fuel requirement and/or reduce the available size of a payload that is to be launched into orbit by a given launch vehicle. Accordingly, there is a need for a multiple space vehicle launch system that minimizes or eliminates the need for such support structure.

SUMMARY

The present disclosure is directed to a multiple space vehicle launch system that may include a first space vehicle, a second space vehicle releasably attached to the first space vehicle and oriented relative to the first space vehicle such that, when placed within a fairing, a launch load from the first space vehicle is transmitted to and borne by the second space vehicle, thereby eliminating the need for Sylda or other reinforcing or support structure. In an embodiment, the first and second space vehicles each may include one of an electrical propulsion motor and a hybrid chemical and electrical propulsion motor. By utilizing electrical propulsion motors in the space vehicles, the total mass of the space vehicle may be significantly reduced when compared to a space vehicle having a chemical propulsion motor, which may enable support structures such as Sylda to be eliminated.

According to an embodiment, a multiple space vehicle launch system may include a first space vehicle, a second space vehicle releasably attached to the first space vehicle and oriented relative to the first space vehicle such that when placed within a fairing, a launch load from the first space vehicle is transmitted to and borne by the second space vehicle. The first and second space vehicles each may include one of an electrical propulsion unit and a hybrid chemical and electrical propulsion unit.

In another embodiment, a spacecraft launch system may include a launch vehicle with a fairing having a payload region, and a plurality of space vehicles disposed within the payload region. The plurality of space vehicles may be oriented in a vertically stacked manner such that at least a portion of gravitational and launch loads of an upper space vehicle are transmitted to and borne by a lower space vehicle. Each of the space vehicles may include at least one of an electrical propulsion unit and a hybrid electrical and chemical propulsion unit.

In yet another embodiment, a method of launching a plurality of space vehicles may include providing a plurality of space vehicles, each of the plurality of space vehicles including at least one of an electrical propulsion unit and a hybrid electrical and chemical propulsion unit, orienting the plurality of space vehicles in a stacked manner within a payload region of a fairing of a launch vehicle such that gravitational and launch loads of an upper one of the plurality of space vehicles is transmitted to and borne by a lower one of the plurality of space vehicles, and launching the launch vehicle with the plurality of space vehicles.

In the embodiments described above and others, the use of traditional inter-launch vehicle fairing, Sylda, and inter-fairing separation systems may be eliminated. This reduces the non-revenue generating payload mass and may reserve more available mass for revenue generating payload. Other objects and advantages will be apparent from the following description, the accompanying drawings and the appended claims.

DETAILED DESCRIPTION

Figure 1:
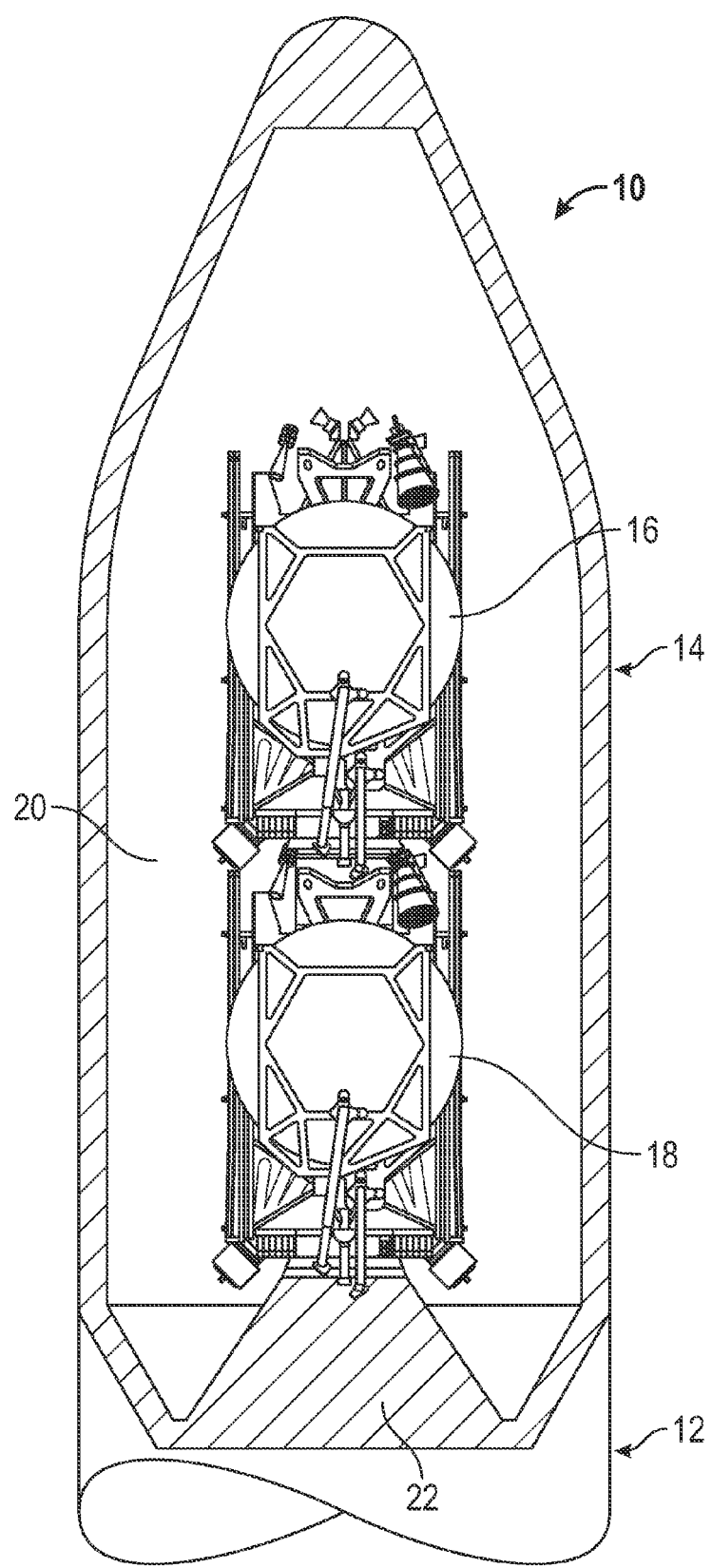
FIG. 1 is a schematic, side elevation in section of an embodiment of the multiple space vehicle launch system of the present disclosure.

As shown in FIG. 1, the multiple space vehicle launch system, generally designated 10, is used with a launch vehicle 12 having a fairing 14. The system 10 may include a first or upper space vehicle, generally designated 16, and a second or lower space vehicle, generally designated 18. The space vehicles are positioned within a payload region 20 of the fairing 14. It should be noted that, although FIG. 1 shows a space vehicle launch system 10 having two space vehicles 16, 18, it is within the scope of the disclosure to provide a space vehicle launch system having three or more space vehicles.

Regardless of the number of space vehicles 16, 18 employed in the launch system, the arrangement of space vehicles within the fairing 14 may be in a stacked, vertical configuration as shown in FIG. 1. The term "vertical" as used herein refers to the orientation of the stacked space vehicles 16, 18 relative to a launch pad (not shown) supporting the launch vehicle 12 when the launch vehicle is oriented in a vertical position, or a vertically stacked manner, relative to the Earth. In an embodiment, the stacked space vehicles 16, 18 may be aligned with, and may coincide with, a central longitudinal axis of the fairing 14 and/or launch vehicle 12. The lower space vehicle 18 may rest upon a base 22 that may be a part of the fairing 14.

Figure 2:
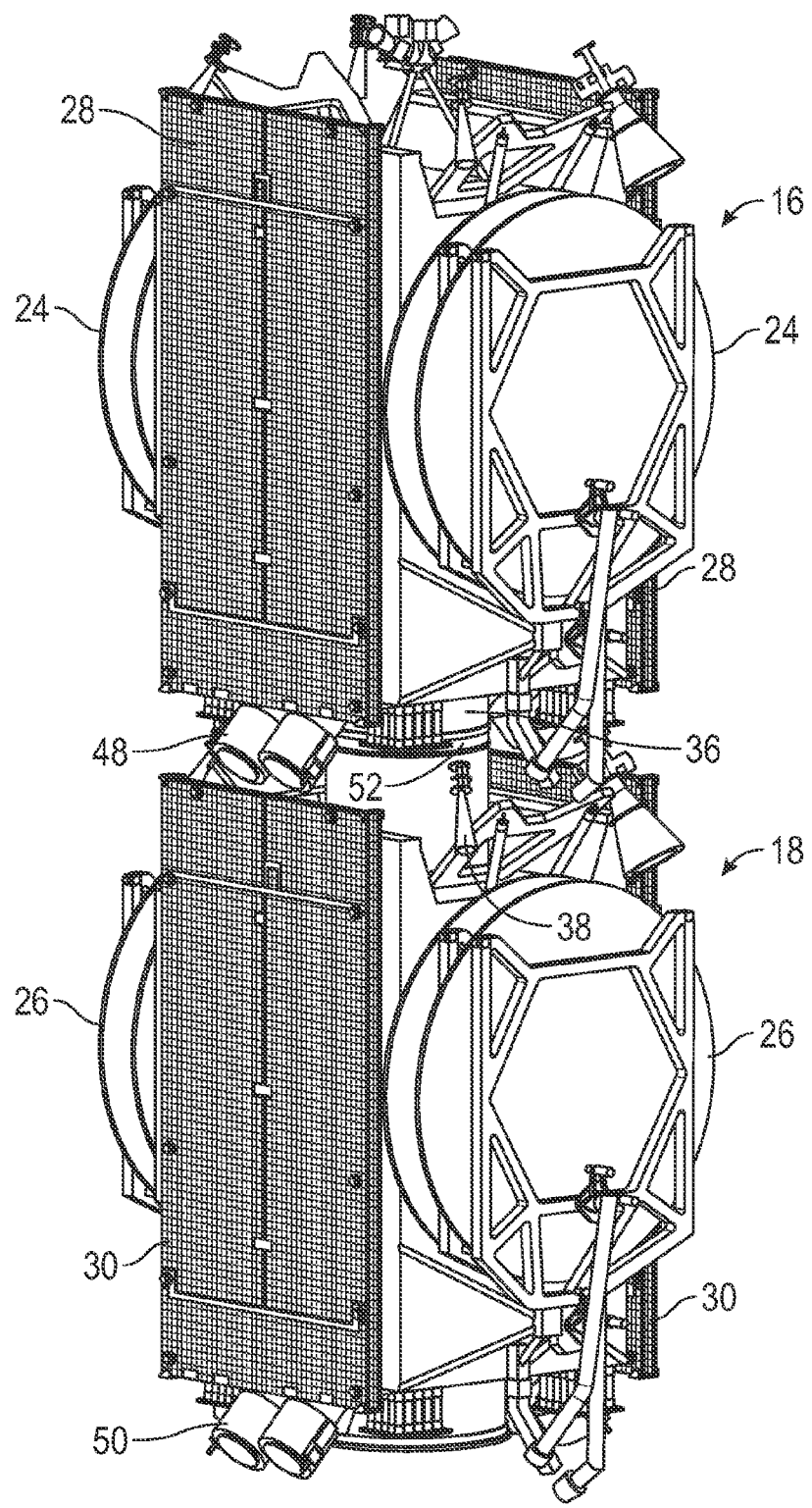
FIG. 2 is a schematic, perspective view of two space vehicles depicted in FIG. 1.
Figure 3:
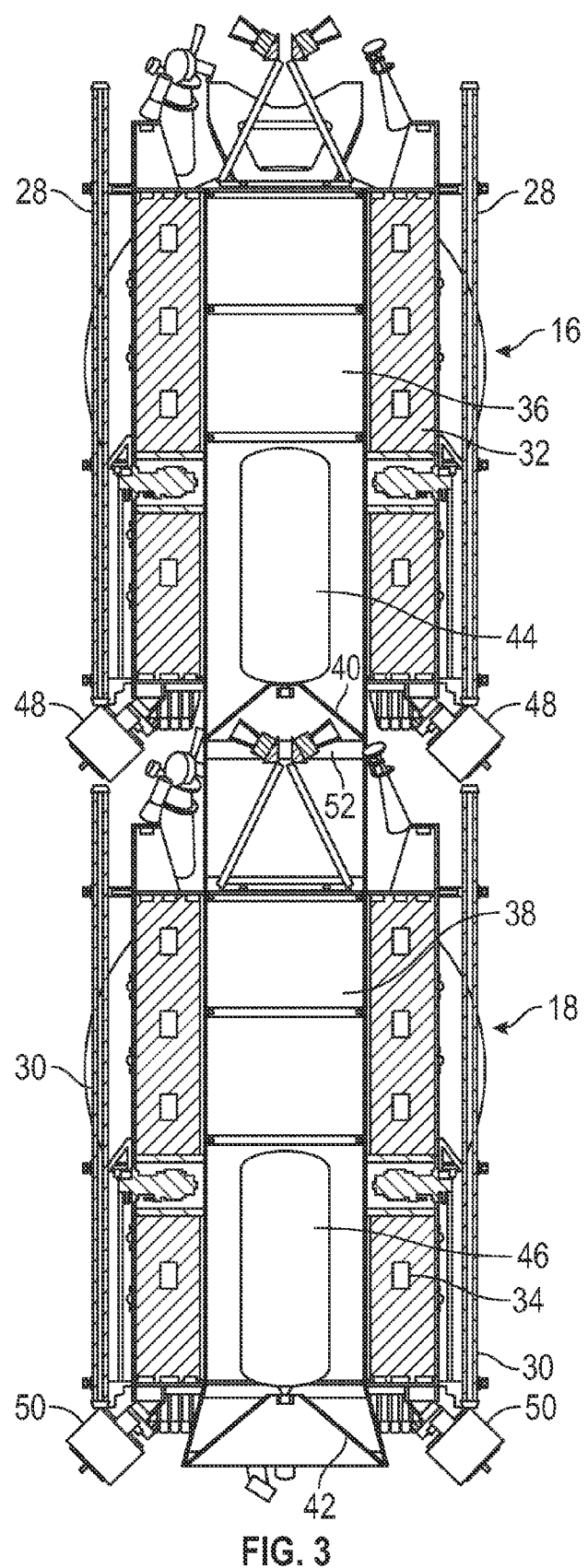
FIG. 3 is a schematic, side elevation in section of the space vehicles depicted in FIG. 1.

As shown in FIGS. 2 and 3, the space vehicles 16, 18 may be satellites. In various embodiments, the space vehicles 16, 18 may be geosynchronous satellites, interplanetary probes, combinations thereof, or any type of space vehicle having a propulsion system that is launched by a launch vehicle 12 (FIG. 1).

The space vehicles 16, 18 may include antenna reflectors 24, 26, respectively, and deployable solar arrays 28, 30, respectively. As best shown in FIG. 3, the space vehicles 16, 18 may include shear load panels 32, 34 that are mounted on core structure 36, 38, respectively.

The core structures 36, 38 may be cylindrical in shape and hollow. Core structures may be of other shapes and not depart from the scope of this disclosure. Core structure 36 may be made of a strong, light material such as graphite, and in one embodiment have a wall thickness of 0.09". Core structure 38 also may be made of a strong, light material such as graphite, and in one embodiment have a wall thickness of 0.45". The shear panels 32, 34 may support the solar arrays 28, 30 of the space vehicles 16, 18, respectively.

In the embodiment shown in FIGS. 2 and 3, the space vehicles 16, 18 each may include an electric propulsion motor, generally designated 40, 42, respectively. Electric propulsion motors 40, 42 may consist of an ion/plasma motor that utilizes Xenon gas as a propellant that is stored in tanks 44, 46 that may be positioned within core structure 36, 38, respectively. The electric propulsion motors 40, 42 also may include exhaust nozzles 48, 50, respectively.

In the embodiment shown in FIGS. 2 and 3, the space vehicles 16, 18 each may include a single electric propulsion motor 40, 42 that may constitute the sole source of propulsion and navigation for that space vehicle; no other propulsion source may be included. The components 40, 42 of space vehicles 16, 18 also may represent other types of electric propulsion motors, as well as hybrid electric/chemical propulsion motors. It is also within the scope of the disclosure to provide space vehicle 16 with an electric propulsion motor 40 and provide space vehicle 18 with a hybrid electric/chemical propulsion motor 42. Use of electric propulsion motors 40, 42, or hybrid electric/chemical propulsion motors may be advantageous because they reduce the overall mass of the space vehicles 16, 18 in comparison to chemical propulsion motors.

In one embodiment, the upper space vehicle 16 may be connected to the lower space vehicle 18 by a pre-tensioned release band 52 that connects the core structure 36 of the upper vehicle with the core structure 38 of the lower vehicle. As shown in the figures, the core structure 38 of the lower vehicle 18 may extend upwardly above the upper edge of the solar arrays 30 of the lower vehicle to engage the core structure 36 which, in the embodiment shown, may not extend beyond the lower edge of the solar arrays 28 of the upper space vehicle.

In operation, the upper and lower space vehicles 16, 18, respectively, first may be attached to each other by the pre-tensioned release band 52. The combined space vehicles 16, 18 may be placed within the fairing 14 of a launch vehicle 12, as shown in FIG. 1, so that the lower space vehicle rests upon the base 22 of the fairing.

When the launch vehicle is standing on the launch pad (not shown), the launch vehicle 12, fairing 14 and space vehicles 16, 18 may be oriented vertically relative to the Earth. In this configuration, the downward gravitational force of the upper space vehicle 16 may be transmitted to and borne entirely by the lower space vehicle 18. In the embodiment shown, this gravitational force may be transmitted entirely from the core structure 36 of the upper space vehicle 16 to the core structure 38 of the lower space vehicle 18.

During liftoff of the launch vehicle 12, the acceleration forces of the upper space vehicle 16 likewise may be transmitted through the core structure 36 to the core structure 38 of the lower space vehicle 18. In the embodiment shown, the upper and lower space vehicles 16, 18 may be linearly and vertically aligned in a vertically stacked configuration so that the gravitational and launch loads of the upper space vehicle 16 are efficiently transmitted to and borne entirely by the lower space vehicle 18.

In conclusion, two configuration features of the disclosed space vehicle launch system combine to provide a reduction in overall launch system mass. First, the individual space vehicles do not use conventional chemical propellant, but instead use electric propulsion, in one embodiment, which has a higher efficiency and thus requires significantly less propellant mass. In another embodiment, the space vehicles may use a hybrid electric/chemical propulsion motor. Second, the space vehicles may be stacked, one on top of the other, so that the launch loads from the upper space vehicle may pass through the lower space vehicle.

The upper and lower space vehicles may include a compatible mounting structure for releasably mounting adjacent spacecraft. This structure may eliminate the need for an inner fairing structure or a fairing separation system, which otherwise might be necessary for multiply manifested spacecraft. The disclosed vehicle launch system may eliminate a significant amount of mass that is not required to fulfill the primary spacecraft mission, which allows more available mass for revenue-generating payload. Further, minimizing propellant mass and non-functional structure mass from the launch vehicle optimizes the overall system mass.

While the forms of apparatus and methods herein described constitute preferred embodiments of this invention, it is to be understood that the invention is not limited to these precise forms of apparatus and methods, and that changes may be made therein without departing from the scope of the invention.

What is claimed is:

1. A multiple space vehicle launch system, comprising:
a first space vehicle including a first core structure;
a second space vehicle including a second core structure releasably attached to the first space vehicle and oriented relative to the first space vehicle such that when placed within a fairing, a launch load from the first space vehicle is transmitted to and borne by the second space vehicle; and
wherein the first core structure is attached to the second core structure.

2. The launch system of claim 1, wherein the first and the second space vehicles are oriented in a stacked configuration.

3. The launch system of claim 1, wherein the first and the second space vehicles are oriented in a vertically stacked configuration during launch.

4. The launch system of claim 1, wherein further comprising a fairing shaped to enclose the first and the second space vehicles.

5. The launch system of claim 4, wherein the fairing includes a base shaped to support the second space vehicle.

6. The launch system of claim 1, wherein the second space vehicle is attached to the first space vehicle such that the launch load from the first space vehicle is transmitted entirely to, and borne entirely by, the second space vehicle.

7. The launch system of claim 1, wherein the launch load from the first space vehicle is transmitted to the second space vehicle through the first core structure and the second core structure.

8. The launch system of claim 1, wherein the first and the second space vehicles each include an electrical propulsion unit.

9. The launch system of claim 8, wherein the electrical propulsion unit is an ion/plasma propulsion unit.

10. The launch system of claim 9, wherein the electrical propulsion unit includes Xenon gas.

11. The launch system of claim 1, wherein at least one of the first and the second space vehicles is a satellite.

12. A spacecraft launch system, comprising:
a launch vehicle including a fairing having a payload region;
a plurality of space vehicles disposed within the payload region, the plurality of space vehicles each having a core structure, the plurality of space vehicles being attached to each other by the core structures thereof and being oriented in a vertically stacked manner such that at least a portion of gravitational and launch loads of an upper space vehicle are transmitted to and borne by a lower space vehicle; and
wherein each of the space vehicles includes at least one of an electrical propulsion unit and a hybrid electrical and chemical propulsion unit.

13. The spacecraft launch system of claim 12, wherein at least one of the space vehicles is a satellite.

14. The spacecraft launch system of claim 12, wherein each of the space vehicles includes an electrical propulsion unit.

15. A method of launching a plurality of space vehicles, the method comprising:
providing a plurality of space vehicles, each of the plurality of space vehicles having a core structure and including at least one of an electrical propulsion unit and a hybrid electrical and chemical propulsion unit;
orienting the plurality of space vehicles in a stacked manner within a payload region of a fairing of a launch vehicle and attaching the plurality of space vehicles to each other by the core structures thereof such that gravitational and launch loads of an upper one of the plurality of space vehicles is transmitted to and borne by a lower one of the plurality of space vehicles; and
launching the launch vehicle with the plurality of space vehicles.

16. The method of claim 15, wherein providing a plurality of space vehicles includes providing at least one satellite.

17. The method of claim 15, wherein providing a plurality of space vehicles includes providing a first space vehicle and providing a second space vehicle.

18. The method of claim 17, wherein orienting the plurality of space vehicles includes attaching the first space vehicle to the second space vehicle such that a launch load of the first space vehicle is transmitted to and borne by the second space vehicle.

19. The method of claim 18, wherein attaching the first space vehicle to the second space vehicle includes attaching a core structure of the first space vehicle to a core structure of the second space vehicle.

20. The multiple space vehicle launch system of claim 1, further comprising the first and the second space vehicles each including a propulsion unit selected from an electrical propulsion unit and a hybrid chemical and electrical propulsion unit.

21. The multiple space vehicle launch system of claim 1, further comprising a pre-tensioned release band that connects the core structure of the first space vehicle with the core structure of the second space vehicle.

22. The multiple space vehicle launch system of claim 1, wherein the core structure of the second space vehicle extends upwardly above an upper edge of solar arrays of the second space vehicle to engage the core structure of the first space vehicle.

23. The multiple space vehicle launch system of claim 22, wherein the core structure of the first space vehicle does not extend beyond a lower edge of solar arrays of the first space vehicle.

\* \* \* \* \*